Patented Sept. 5, 1933

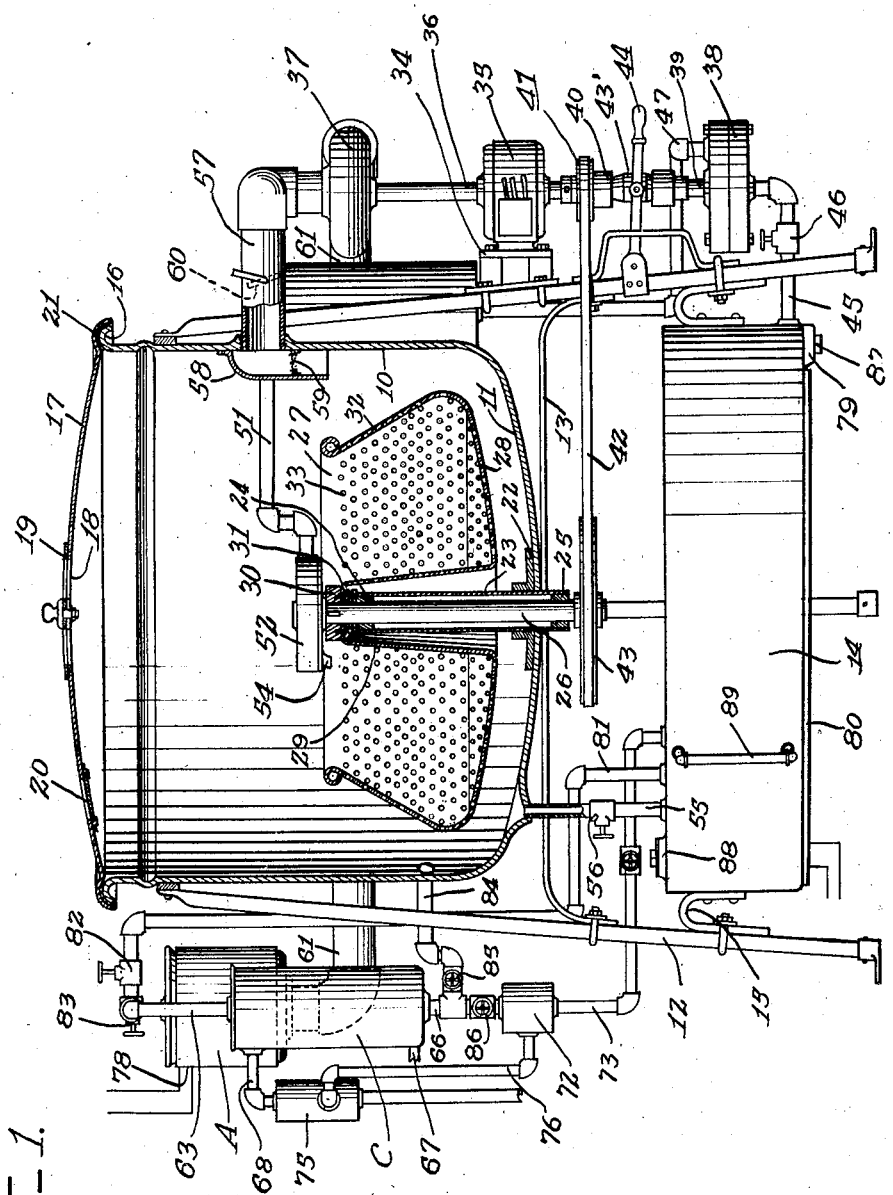

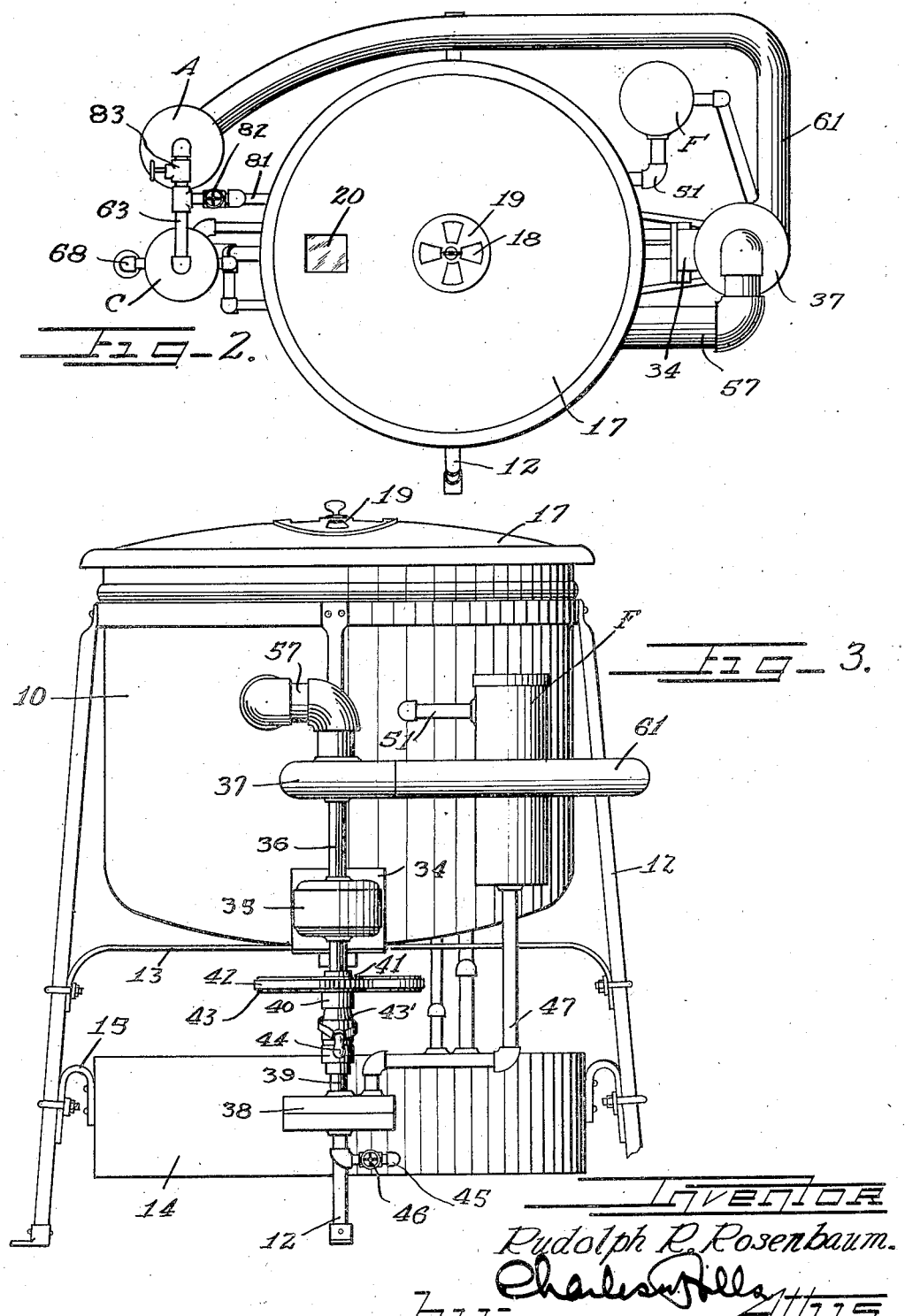

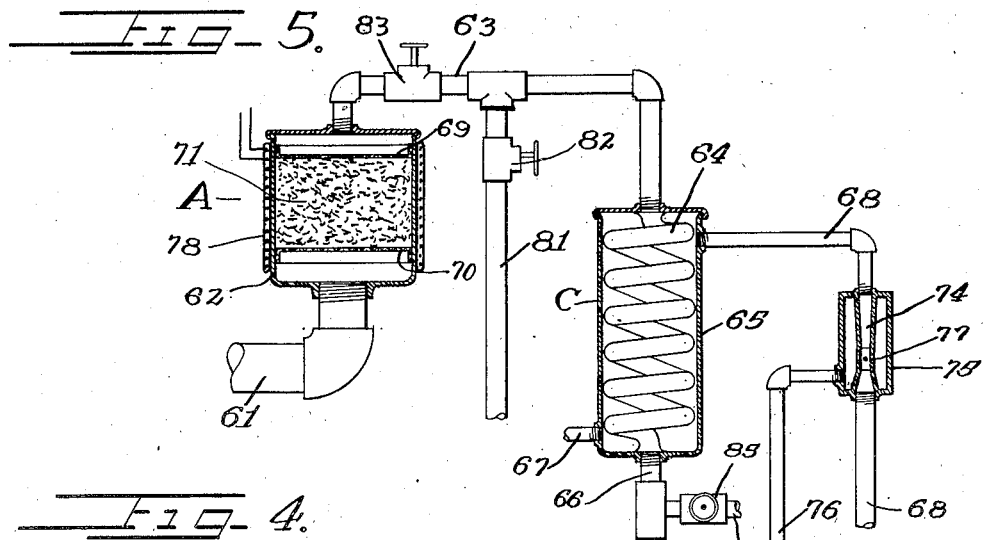
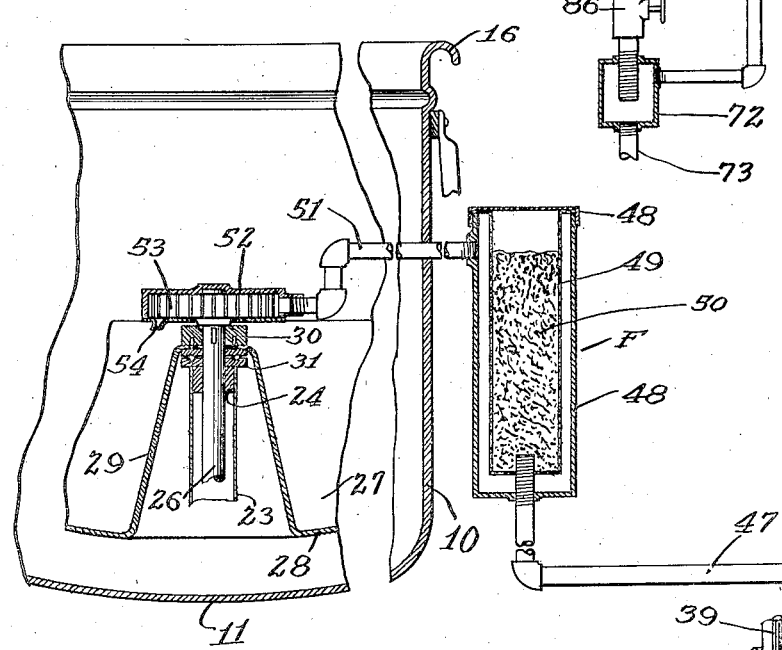
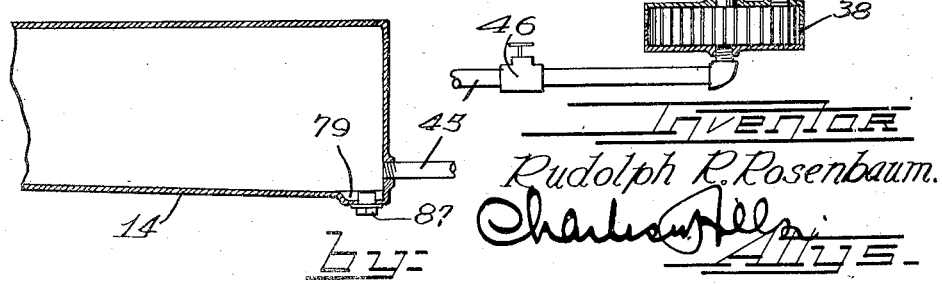

1,925,462

UNITED STATES PATENT OFFICE 1,925,462

DRY CLEANING MACHINE

Rudolph R. Rosenbaum, Chicago, Ill.

Application August 4, 1930. Serial No. 472,970

7 Claims. (Cl. 68—18)

My invention relates to dry cleaning machines, and particularly to that type in which a basket or holder is rotated within a tub containing cleaning fluid.

An important object of the invention is to provide an improved form of basket for containing the articles to be cleaned, the basket being frusto-conical with its sides inclined inwardly to a comparatively large degree in order that, when the basket is rotated, the contents will be moved along the inclined sides and upwardly to fall back by gravity toward the bottom of the basket, thereby causing the basket contents to be agitated and kept open and separated for the ready application thereto of cleaning fluid and whereby to prevent packing of the contents into compact form against the basket side.

Another important object is to provide a basket which is hung or suspended on an axial support with the load below the point of support, in order to assure more balance and less vibratory travel of the basket.

A further object is to provide for more thorough and efficient cleaning by rotating the basket at comparatively slow speed while the contents are moved up and down during rotation of the basket and application of cleaning fluid thereto, the speed of the basket being just sufficient to cause the inclined sides thereof to effect the up and down movement of the basket contents.

A still further object is to utilize the pressure of the cleaning fluid delivered to the basket for driving a fluid motor to control the slow rotation of the basket during the washing operation of the contents and to provide an independent motor for rotating the basket at higher speed to cause drying of the washed contents by centrifugal force.

Still another object of the invention is to provide improved means for withdrawing from the tub the vapors generated when the basket is rapidly rotated during a drying operation and to pass such vapors through condensing means from which the condensate is returned to a supply tank for the machine.

A further object is to provide simple, compact means in the form of an absorption device for receiving and storing the vapors of several drying operations of the machine, together with means for driving the accumulated vapors from the device and condensing them for return to the supply tank for the machine.

Another object is to provide means for heating the used cleaning fluid in the supply tank to a distilling temperature and utilizing the vapor condensing means for the machine to condense such vapors of distillation and to deliver the condensate for reuse in the machine.

A further object is to provide a machine which is of simple, compact and economical construction, which is readily portable and which utilizes the cleaning fluid without permitting escape of any of the vapors thereof into the open and which condenses the generated vapors and returns them to the supply tank without any material loss of cleaning fluid.

The above enumerated and other important features of the invention are incorporated in the structure disclosed on the drawings, in which drawings:

Figure 1 is a front elevational view of the machine with the tub and spinner basket in vertical diametrical section;

Figure 2 is a plan view of the machine;

Figure 3 is a side elevation;

Figure 4 is an enlarged section of the tub and associated parts, showing the fluid circulating system; and Figure 5 is a view, partly in section, of the absorber and condenser elements and connections.

The machine comprises a tub 10 shown of cylindrical form and with a dished bottom 11. The tub is secured near its upper end to the upper ends of legs 12, and the tub rests on a spider frame 13 supported by and between the legs. Below the tub is a supply tank 14 for cleaning fluid, which may be supported upon the legs 12 by suitable fittings 15.

The upper edge 16 of the tube is curled outwardly to receive a cover 17 which may have bent openings 18 controlled by a damper 19, and which preferably has a glazed sight opening 20. A sealing gasket 21 may be interposed between the tub and the cover. The tub and cover may be enameled, or they may be entirely of a suitable metal or lined by such metal in order to be protected against chemical action by cleaning fluid.

Secured to the bottom 11 of the tub concentric therewith is a hub 22, and secured to the hub and extending vertically upwardly therethrough is a tube 23. Aligned axially within the tube by upper and lower bushings 24 and 25 secured to the tube is a shaft 26. Concentric with the shaft is a spinner basket 27 of sheet metal and of frusto-conical shape and with a dished bottom 28. The bottom is deflected upwardly at its axis to within a short distance of the top of the basket to form a frusto-conical support or hub 29 for the basket. The shaft extends through the top wall of this hub, and a collar 30, keyed to the shaft, is secured to the top wall of the hub in any suitable manner, so that the basket will be secured to the shaft to rotate therewith. To reduce friction, a suitable ball bearing structure 31 is interposed between the top of the basket hub and the top of the tube 23, the tube 23 thus supporting the weight of the hanging or suspended basket and its contents. The bottom wall 28 and the side wall 32 of the basket have the perforations 33 for the flow of cleaning fluid. The corner of the basket between the bottom and side is rounded, as shown, and the upper edge of the basket is curled around or beaded to increase the rim strength and to afford a smooth edge.

On a bracket 34, secured to the machine framework at one side thereof, is mounted an electric drive motor 35 whose shaft 36 is vertical, the shaft being connected at its upper end to the rotor member of a blower or suction fan 37. Below the motor a fluid pump 38 is secured in any suitable manner to the machine frame in axial alignment with the motor, the rotor of the pump being secured on a shaft 39. Directly below the motor the shaft 36 receives a hub 40 with a belt pulley 41 thereon connected by a suitable belt 42 with the sheave 43 secured to the lower end of the shaft 26 connected with the spinner basket. Suitable clutch mechanism 43 is associated with the shafts 36 and 39 and is controllable by a lever 44 to connect the driving motor with the pulley hub 40, or to connect the pump to be driven by the motor. When the clutch lever is in neutral position, both the pump and the drive pulley will be disconnected from the motor drive shaft.

The inlet of the pump 38 is connected by a pipe 45 with the supply tank 14 near the bottom thereof, and the flow is controlled by a valve 46. The pump outlet is connected by a pipe 47 with a filter structure F comprising the outer casing 48 and the inner frame or basket 49 for containing suitable filtering material 50, the basket being perforated. The pipe 47 extends upwardly through the bottom of the outer casing 48 and discharges into the bottom of the filter basket. From the upper end of the outer casing 48, a pipe 51 extends through the side of the tub (Fig. 4) and connects with the tangential inlet of a turbine structure 52 which is mounted just above the spinner basket and has its rotor 53 connected with the upper end of the basket driving shaft 26. The pipe 51 may serve to hold the turbine frame against rotation, and the outlet 54 of the turbine directs the discharged cleaning fluid downwardly into the basket into contact with clothes in the basket to be cleaned. The pressure of the fluid discharged into the turbine by the pump will revolve the turbine and, consequently, rotate the spinner basket, such rotation being at a comparatively low speed. During such rotation, the fluid discharge from the turbine is directed against the clothes within the basket. Surplus cleaning fluid in the tub will return to the supply tank 14 through a pipe 55 controlled by a valve 56.

In the preferred operation of the machine, as will be more clearly explained hereinafter, the basket with the clothes therein is first rotated by the fluid motor turbine so that the fluid discharged from the turbine may thoroughly soak in and filter through the clothes to carry away dirt, grease, etc., and then, after the fluid has been drained from the tub, the electric motor is connected to rotate the basket at a very much higher speed so as to extract the cleaning fluid by centrifugal force from the clothes to cause drying thereof. During such drying operation, the discharged fluid will be more or less vaporized, and I provide improved means for drawing such vapor out of the tub, condensing the same, and returning the condensate to the supply tank 14.

The drawing off of the vapor is accomplished by the blower or fan 37, which, as clearly shown in Figure 1, has its inlet connected by a duct 57' with the interior of the tub, the inlet of the duct being covered by a baffle frame 58 having the screen 59 through which the vapor must pass before reaching the blower, the screen serving to filter out any solid matter which might be carried by the vapor. The duct 57' is also provided with a flow-controlling valve 60. Of course, while the machine is in operation, the cover 17 will be in secure, tight-fitting position on the tub. In order to prevent the formation of a vacuum which might retard the drawing off of the vapor, the vent openings 18 in the cover may be suitably regulated by the damper 19.

The rapidly collected vapor could be condensed within the period of each drying operation of the machine provided the condenser were large enough. It is, however, impractical to use a large condenser, and I, therefore, provide means which will make the use of a small compact condenser possible and which will retain and accumulate the greater part of the vapors of the drying operations and which retained vapors may be subsequently driven off through the condenser and the condensate returned to the supply tank. Referring to Figures 1 and 5, the outlet of the suction fan or blower 37 is connected by a duct 61 with the bottom of a vapor retaining or absorbing device A. This device comprises the cylindrical tank 62, through the bottom of which the pipe 61 extends. A pipe 63 leads from the top of the tank to the upper end of the condensing coil 64 within the shell 65 of the condenser structure C, the lower end of the coil being connected with a return pipe 66. Cooling water enters the condenser shell at the bottom through a pipe 67 and flows out from the top through a pipe 68.

Within the tank 62 of the absorber structure are upper and lower screens 69 and 70 between which is some absorbent material 71, such as silica gel, such material being particularly effective in retarding the flow of and absorbing vapors of cleaning fluids used in machines of this type.

When it is desired to withdraw the vapor from the tub, the valve 60 in the blower inlet duct is opened, and the drawn out vapors will be discharged into the absorber structure A, where they will be in greater part retained and held by the absorbent material. Those vapors that pass through reach the condenser and flow through the cooling coil thereof and are condensed, and the condensate is eventually returned to the supply tank 14. To assist in drawing the vapor into the cooling coil and also to withdraw from the condensate any uncondensed vapor, I interpose the suction chamber 72 in the condensate return circuit, the pipe 66 extending partly into said chamber and a pipe 73 leading from the chamber back to the supply tank 14. The suction within the chamber 72 is created by means of a Venturi tube 74 interposed in the water discharge pipe 68 from the condenser shell. The chamber is surrounded by the suction chamber 75 connected by pipe 76 with the top of the suction chamber 72. Orifices 77 are provided in the Venturi tube at the throat thereof, and, as the water flows through the pipe 68 and through the tube, the suction created at the orifices is communicated to the chambers 75 and 72, and any uncondensed vapors which would tend to follow the condensate back to the tank 14 will be drawn out of the condensate circuit and carried with the discharged water from the condenser to the sewer, such uncondensed vapors being then prevented from polluting the atmosphere.

For the absorber structure A, I provide heating means 78 which may be a steam jacket, hot water or oil jacket, an electric coil, or other suitable means for supplying a controllable temperature. After a period of use of the machine, the absorber is then heated and the accumulated vapor in the absorbent material will be driven therefrom and will flow through the condenser C to be condensed. The rate of heating is such that the rate of flow of the vapor will be proportionate to the size and capacity of the condenser, so that the condenser can efficiently perform the condensing operation with a minimum loss. The condensate from these vapors is returned to the supply tank 14.

Describing the operation of the machine for cleaning purposes, the cover 17 is removed and the clothes or other articles to be cleaned are placed within the spinner basket 27. The clutch lever 44 is then shifted (Fig. 1) to connect only the pump with the electric motor, whereupon fluid is drawn from the supply tank 14 and delivered under pressure through the pipe 51 to the turbine 52, so that the basket will be rotated. The fluid discharged from the turbine will be projected against the basket contents and will percolate and flow therethrough, and the return valve 56 may be closed for a while until the fluid rises to a desired level in the basket, for example, to a level just above the corner bend of the basket, and then the valve 56 is adjusted so that this level will be maintained during the washing operation. During rotation of the basket, the contents will be more or less agitated and thrown outwardly by centrifugal force and solid particles, dirt, dissolved matter and other loose matter will drop through the basket perforations and will flow with the fluid back into the tank 14 and will settle in a sump 79 provided in the tank.

After a washing and cleaning operation of the clothes, the valve 56 is first opened wide to drain out the fluid from the tub, and then the clutch is shifted to disconnect the pump from the motor and to connect the drive pulley 41 with the motor so that, through the belt 42, the basket will be rotated at a comparatively high speed in order that all the fluid within the clothes will be extracted therefrom by centrifugal force, the extracted fluid flowing back to the supply tank. The valve 60 having been opened, the vapors generated during the drying operations are carried off to the absorber device and to the condenser, as has already been explained, and the vapors are prevented from entering the room in which the machine is being operated and are practically all collected and condensed and returned to the supply tank. After the clothes have been thoroughly dried, the cover is removed from the tub and the clothes are withdrawn from the basket.

The basket being supported at the top, i. e., being suspended or hung from the top of the driving shaft 26, will be more balanced in its operation and will not unduly strain the shaft.

Applicant's method and procedure for washing and cleaning has been found to be more practical and efficient than prior methods. The prior methods have usually been to spin the basket at comparatively high speed during the discharge of cleaning fluid against the basket contents. With such high speed, the contents are compressed up against the sides of the basket into such compact form that any material, such as grease, which has been dissolved from one part of the clothes will be carried by centrifugal force to be spread throughout the clothes. In other words, the cleaning fluid is hampered and prevented from efficient passage through the material of the clothes to properly dissolve and remove therefrom the matter to be cleaned away. In applicant's procedure, the basket is run at comparatively low speed. The clothes are thus gradually moved around in the basket without being tightly folded and compacted together, and the cleaning fluid can then percolate freely therethrough and carry off the dissolved foreign matter and prevent spreading of such dissolved matter to other parts of the clothes. By adjusting the valve 46, the volume of pressure of the fluid delivered to the turbine can be regulated and the speed of the basket thereby adjusted.

After a period of use of the machine, the fluid will become discolored, and the supply tank will have an accumulation of sand, dirt and other matter extracted from the clothes. I, therefore, provide for distilling the fluid by heating it and driving the vapor through the condenser C for condensation. Below the supply tank 14, I provide suitable heating means, as, for example, an electric heating pad 80, and I provide the outlet pipe 81 from the top of the tank to the condenser. In this pipe, I provide a valve 82 which is kept closed when the machine is operated for washing and drying but which is opened for the distillation of the tank contents. In the pipe 63, between the pipe 81 and the absorbing device A, I insert a valve 83 which is opened for the washing and drying operation of the machine but which is closed when the tank contents are to be distilled.

For the distilling operation, a pipe 84 extends from the outlet end of the condenser coil to the tub 10 a distance above the bottom thereof, and this pipe includes a valve 85 which is opened only when the tank contents are to be distilled. A valve 86 is included in the condensate return pipe 73 from the condenser at a point outside the valve 85, and this valve 86 is, of course, opened during the washing and drying operation of the machine but is closed when the tank contents are to be distilled.

When the tank contents are now heated, the distillate will flow through the pipe 81 and valve 82 directly to the top of the condenser coil 64 and the vapor will travel through the coil to be condensed, and the condensate will flow through valve 85 and into the tub 10, the valve 56 having previously been closed. The heat for the tank is so regulated that the condenser C may take care of the condensation without material loss.

After the tank contents have all been distilled off from the tank 14 and the condensate has been collected in the tub 10, the tank 14 may be cleaned by withdrawing the plug 87 at the sump 79, and the accumulated solid matter, grease, etc. may be cleaned out of the tank. After the tank has been cleaned, the valve 56 is opened and the cleaned condensate is returned from the tub to the tank ready for further operation of the machine. The tank is provided with a filler opening 88 through which additional fluid may be filled in. A gauge glass 89 is also provided for indicating the level of the fluid in the tank. After the distillation process, the various valves are again adjusted for the washing and drying operation of the machine.

After a period of use of the machine, the filter structure F may also be cleaned. As shown, the filler material basket 49 is suspended from the cover 48' of the filter frame and, by raising the cover, the filter cage may be withdrawn and the filler material removed and fresh filler material inserted.

The heating of the silica gel or other absorbent material in the absorber structure A, besides driving off the accumulated vapors, also revivifies the absorbent material.

I thus provide a simple, efficient and readily transportable machine by which clothes or other articles may be efficiently and thoroughly cleaned and rapidly dried, and where, during operation of the machine, the vapors are withdrawn, condensed and returned to the fluid supply tank, together with a simple arrangement for distilling of the tank contents, cleaning of the supply tank and restoring thereto of the distilled condensate in clean form. Loss of fluid, therefore, is reduced to a minimum, and the same fluid can be used over and over again for efficient washing.

Although I have shown an efficient and practical embodiment of the various features of my invention, I do not wish to be limited thereto, as changes and modifications in structure, arrangement and operation may be made without departing from the scope and principles of my invention.

I claim as follows:

1. In a dry cleaning machine, the combination of a tub, a clothes-receiving basket mounted in said tube for rotation therein, a motor and means for connecting it to drive said basket at comparatively high speed, a pump connected to be driven by said motor for supplying cleaning fluid to the basket, a turbine connected with said basket and connected to receive fluid under pressure from said pump, and means for disconnecting said motor from said basket and for connecting the motor with said pump to cause said basket to be rotated at lower speed by said turbine.

2. In a dry cleaning machine, the combination of a tub, a clothes-containing basket mounted for rotation in said tub, an electric driving motor connected to drive said basket, a fluid motor connected to drive said basket, a pump connected to be driven by said electric motor for pumping cleaning fluid through said fluid motor to the basket, and means for disconnecting said basket from said electric motor whereby said fluid motor may be driven by the fluid from said pump to rotate said basket at slower speed.

3. In a dry cleaning machine, the combination of a stationary tub, a clothes-receiving basket mounted in said tub to rotate about a vertical axis, an electric driving motor connected to drive said basket at high speed, a fluid-driven motor connected to drive said basket at lower speed, fluid supply means, a pump connected with said supply means and said fluid motor, and clutch mechanism for connecting said electric motor with said basket to cause rotation of said basket at high speed and means whereby said clutch mechanism is operable to disconnect said basket from said electric motor and to effect connection of said electric motor with said pump whereby fluid under pressure will be delivered by said pump to said fluid motor and said fluid motor operated to rotate said basket at lower speed.

4. In a dry cleaning machine, the combination of a tub, a vertical drive shaft in said tub, a clothes-receiving basket suspended on said shaft for rotation therewith, a fluid motor on said shaft, an electric motor, fluid supply means, a pump connected with said fluid motor and said supply means, means for connecting said electric motor with said driving shaft to cause rotation of said basket at comparatively high speed, and means for disconnecting said electric motor from said shaft and connecting it with said pump, whereby the fluid under pressure from said pump will operate said fluid motor to cause rotation of said basket at reduced speed.

5. In a cleaning machine, the combination of a tub, a spinner basket within said tub for receiving articles to be cleaned, a source of cleaning fluid, a fluid motor connected with said basket, a conductor connecting said source with said motor, a pump in said conductor for forcing fluid therethrough under pressure to said fluid motor, a main driving motor having connection with said pump to drive said pump to operate said fluid motor to cause rotation of said basket thereby, means directing the discharge from said fluid motor to the contents of said basket, and means for disconnecting said main driving motor from said pump and for connecting it for directly driving said basket.

6. In a cleaning machine, the combination of a tub, a basket rotatable within said tub and adapted to receive articles to be cleaned, a fluid motor mounted on said basket, a pump for supplying cleaning fluid under pressure to said fluid motor, said fluid motor discharging into said basket, a main driving motor having driving connection with said basket, and means for disconnecting said main driving motor from said basket and connecting it with said pump to drive said pump to deliver cleaning fluid under pressure for operation of said fluid motor and rotation of the basket thereby.

7. In a cleaning machine, the combination of a tub, a basket rotatable within said tub for containing articles to be cleaned, a main driving motor having driving connection with said basket, a fluid motor having driving connection with said basket to drive said basket at a different speed, a pump for delivering fluid under pressure to said fluid motor for operation thereof, and means for disconnecting said main driving motor from said basket and for connecting it to drive said pump.

RUDOLPH F. ROSENBAUM.